US011898897B2

(12) United States Patent
Yokoyama et al.

(10) Patent No.: US 11,898,897 B2
(45) Date of Patent: Feb. 13, 2024

(54) COMBINATION WEIGHING DEVICE

(71) Applicant: Yamato Scale Co., Ltd., Hyogo (JP)

(72) Inventors: Shinya Yokoyama, Hyogo (JP); Yuki Shimizu, Hyogo (JP)

(73) Assignee: Yamato Scale Co., Ltd., Hyogo (JP)

( * ) Notice: Subject to any disclaimer, the term of this patent is extended or adjusted under 35 U.S.C. 154(b) by 474 days.

(21) Appl. No.: 17/286,081

(22) PCT Filed: Dec. 10, 2019

(86) PCT No.: PCT/JP2019/048220
§ 371 (c)(1),
(2) Date: Apr. 16, 2021

(87) PCT Pub. No.: WO2020/122051
PCT Pub. Date: Jun. 18, 2020

(65) Prior Publication Data
US 2021/0381878 A1    Dec. 9, 2021

(30) Foreign Application Priority Data

Dec. 14, 2018  (JP) ................................. 2018-233976

(51) Int. Cl.
*G01G 19/387* (2006.01)
(52) U.S. Cl.
CPC ................... *G01G 19/387* (2013.01)
(58) Field of Classification Search
CPC ............................ G01G 19/387; G01G 19/393
See application file for complete search history.

(56) References Cited

U.S. PATENT DOCUMENTS

| 5,753,866 A * | 5/1998 | Ikeda | G01G 19/393 209/939 |
| 2015/0021103 A1* | 1/2015 | Tamai | G01G 19/387 177/25.18 |
| 2016/0334265 A1* | 11/2016 | Kageyama | G01G 19/00 |
| 2021/0381879 A1* | 12/2021 | Yokoyama | G01G 19/393 |
| 2022/0288642 A1* | 9/2022 | Young | G01G 13/024 |

FOREIGN PATENT DOCUMENTS

| JP | 5-330632 A | 12/1993 |
| JP | H1183607 A * | 3/1999 |
| JP | 2012-237576 A | 12/2012 |
| JP | 3198972 U * | 7/2015 |
| JP | 2016-148557 A | 8/2016 |
| JP | 2018-077074 A | 5/2018 |
| JP | 2018-077075 A | 5/2018 |
| JP | 2018112429 A * | 7/2018 |
| JP | 2018-184260 A | 11/2018 |
| WO | 2004/042335 A1 | 5/2004 |
| WO | WO-2019239498 A1 * | 12/2019 |

* cited by examiner

*Primary Examiner* — Natalie Huls
(74) *Attorney, Agent, or Firm* — Norris McLaughlin, P.A.

(57) ABSTRACT

When there is currently no article at an upstream end of a trough of a downstream linear feeder, an upstream linear feeder is driven to operate until any article detected by an upstream article detector. In case no article is still detectable by the upstream article sensor when a predetermined period of time is passed after the upstream linear feeder starts to be driven, the upstream linear feeder is driven to operate by an increased vibration strength based on the assumption that an article(s) is being jammed or articles are being stuck together on an upstream side of the upstream linear feeder.

10 Claims, 13 Drawing Sheets

Front-back direction

Front-back direction

Lateral direction

Front-back direction

F I G. 6
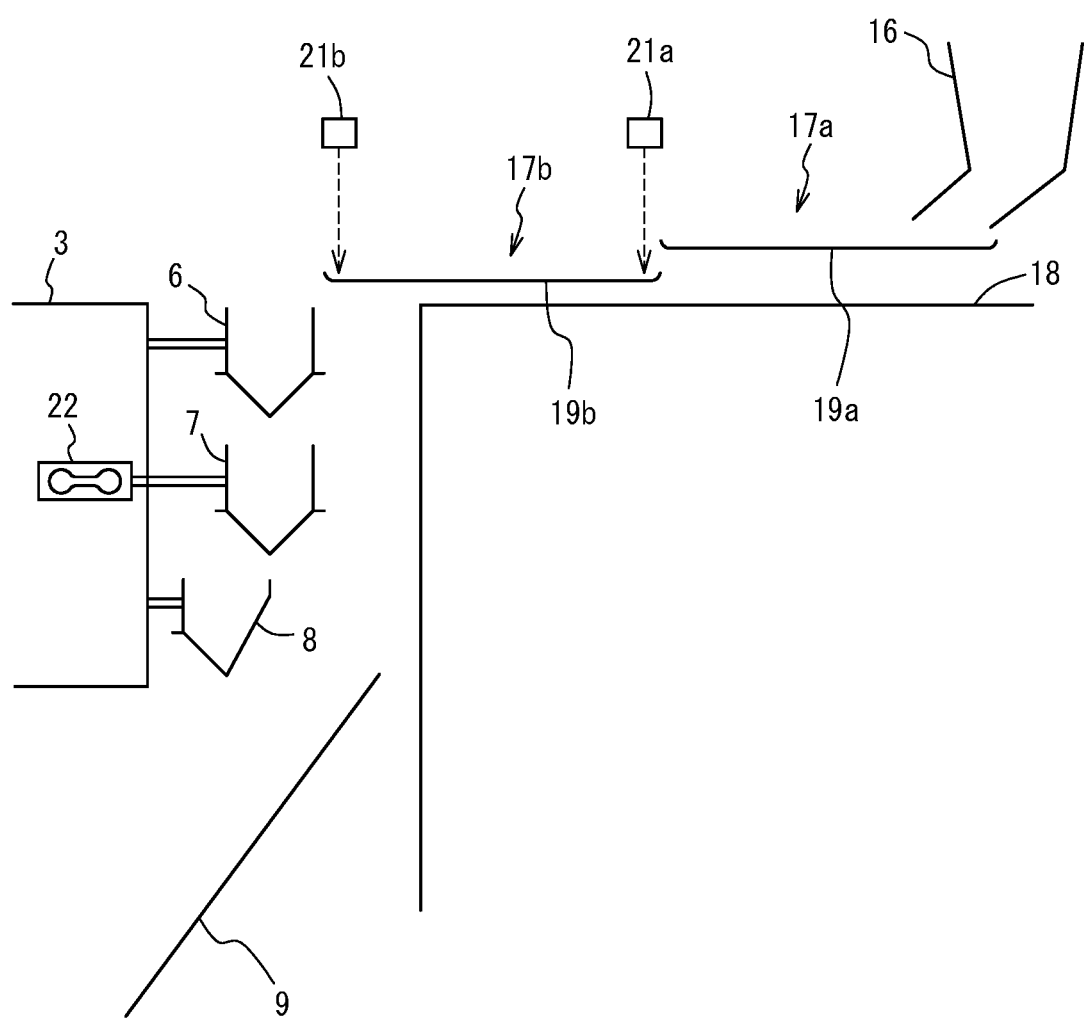

COMBINATION WEIGHING DEVICE

TECHNICAL FIELD

The present invention relates to a combination weighing device for use in mixing and weighing certain quantities of articles, for example, food stuffs including sweets and snacks, more particularly to a combination weighing device suitable for use in mixing and weighing small quantities of different kinds of articles that range in a wide variety.

BACKGROUND ART

Patent document 1 describes an example of combination weighing devices designed to mix and weigh different kinds of articles. The combination weighing device described in this patent document 1 is equipped with: a plurality of weighing units each having a supply hopper and a weighing hopper that are vertically disposed; and supply units that supply these weighing units with articles to be weighed. This device may be called a combination weighing device of horizontal arrangement, in which the weighing units and the supply units are linearly arranged next to each other.

Patent document 2 describes another example of such combination weighing devices. The combination weighing device described in this patent document 2 is equipped with: a dispersing feeder formed in a conical shape that receives supplied articles and transports the received articles outward; and weighing units each having a supply hopper and a weighing hopper. This combination weighing device may be called a weighing device of circular arrangement in which the weighing units are arranged around the dispersing feeder along its circumference.

When an operator wants to handle a broader range of articles to be mixed and weighed with this weighing device in which the weighing units are circularly arranged, the operator may need to secure a larger space in all directions around the dispersing feeder by increasing its diameter, so that more weighing units including supply hoppers and weighing hoppers can be arranged circumferentially around the dispersing feeder.

When a broader range of articles should be mixed and weighed with the weighing device of horizontal arrangement, on the other hand, the weighing units and the supply units that are linearly arranged may be simply increased in the directions of their linear arrangement. The weighing devices of this type, therefore, may be allowed to have a relatively flat and compact structure, as compared to the combination weighing devices of circular arrangement.

CITATIONS LIST

Patent Document

Patent Document 1: Japanese Unexamined Patent Publication No. 2018-77074
Patent Document 2: Japanese Unexamined Patent Publication No. 2012-237576

SUMMARY OF INVENTION

Technical Problems

In the horizontal combination weighing device described in Patent Document 1, articles to be weighed are supplied from the retaining hopper of the supply unit into the supply feeder, and then transported by the supply feeder into the supply hopper of the weighing unit.

When the retaining hopper is short of the articles in this weighing device, the weighing device may have to be manually resupplied with articles. Under such circumstances, the retaining hopper may desirably have a greater capacity that can afford to retain as many articles as possible in order to automatically operate the device for long hours without manpower.

In case the retaining hopper is designed to have a greater capacity for more articles to be retained, however, a certain type(s) of articles may possibly block or may be jammed at a supply port and/or its vicinity through which the articles are supplied from the retaining hopper into the supply feeder, or the articles may be immovably stuck together in the retaining hopper.

In this instance, an operator may have to remove the article(s) blocking or being jammed at and/or near the supply port or loosen the articles being stuck together in order to restart normal and reliable transport of the articles.

Patent Document 1 describes a weighing device equipped with a plurality of supply feeders that are disposed in tandem in stages from an upstream side toward a downstream side in a direction of transport of the articles. In the weighing device described in this document, the articles are transported from the upstream supply feeders disposed at higher positions into the downstream supply feeders disposed at lower positions. In this weighing device, if the operation of the upstream supply feeder is suspended when a sensor is detecting the articles transported from an article-outgoing end of the upstream supply feeder and arriving at an article-incoming end of the downstream supply feeder, unfavorable events described below may possibly occur in the weighing device described in this patent document.

The sensor is disposed in the device to detect the articles at the article-incoming end of the downstream supply feeder. The articles, if they are, for example, long and thin, may happen to partly stick out upward above the article-incoming end of the downstream supply feeder from the article-outgoing end of the upstream supply feeder. Such an article (s) may be wrongly detected and determined by the sensor as such that has been supplied from the upstream supply feeder into the downstream supply feeder, based on which the operation of the upstream supply feeder may be correspondingly suspended. If the operation of the upstream supply feeder is suspended when the article(s) sticking out at the article-outgoing end of the upstream supply feeder, the sensor may indefinitely keep the result of false detection, and the downstream supply feeder, though actually empty at its article-incoming end, may be wrongly detected as having already been supplied with the articles. As a result of the false detection, the upstream supply feeder may be indefinitely left inactive without having to supply the articles into the downstream supply feeder.

The articles, of which a part thereof remaining stuck out in a balanced state upward above the article-incoming end of the downstream supply feeder from the article-outgoing end of the upstream supply feeder, may be wrongly detected as such that have been supplied from the upstream supply feeder into the downstream supply feeder. Such a false detection may render the upstream supply feeder indefinitely inactive, adversely affecting normal and reliable transport of the articles after the event.

In this instance, an operator may be required to supply any article(s) that remains being stuck out in a balanced state at the article-outgoing end of the upstream supply feeder into the downstream supply feeder in order to ensure normal and reliable support of the articles.

The present invention was accomplished to address these issues of the known art and is directed to providing solutions as quickly as possible to problems, for example, articles blocking the transport passage or being stuck together and any transport failures associated with such articles.

Technical Solutions

To this end, the present invention provides the following technical features.

1) A combination weighing device according to the present invention is provided with: at least two linear feeders including an upstream linear feeder and a downstream linear feeder, the linear feeders being disposed to transport an article from an upstream side to a downstream side in a direction of transport; a controller in charge of drive controls of the linear feeders; and an upstream article detector that detects the article currently present at an upstream end of a trough of the downstream linear feeder in the direction of transport. The combination weighing device is further characterized in that the controller, when the upstream article detector is not detecting the article, drives the upstream linear feeder to operate until the article is detected by the upstream article detector, and the controller, when a predetermined period of time is passed after the upstream linear feeder starts to be driven, drives the upstream linear feeder to operate by an increased vibration strength.

According to the present invention, the upstream article detector is provided that detects articles at the upstream end of the trough of the downstream linear feeder. When no article is being detected by the upstream article detector, i.e., when there is currently no article at the upstream end of the trough of the downstream linear feeder, the upstream linear feeder continues to be driven until any article is detected by the upstream article detector.

In case no article has been detected by the upstream article detector, i.e., in case no article has been supplied to the upstream end of the trough of the downstream linear feeder when a predetermined period of time is passed after the upstream linear feeder starts to be driven, the upstream linear feeder may be determined as receiving no article based on the assumption that the flow of articles is being disturbed on the upstream side of the upstream linear feeder, for example, the articles are possibly blocking or being jammed at a supply port and/or its vicinity through which the articles are supplied into the upstream linear feeder. Then, the upstream linear feeder is driven to operate by an increased vibration strength. An intensive vibration generated by the upstream linear feeder thus driven by the increased vibration strength may successfully remove the article(s) blocking or being jammed at and/or near the supply port or loosen the articles being stuck together. Thus, an operator may no longer have to remove or loosen with hand any articles being jammed or stuck together.

2) A combination weighing device according to the present invention is provided with: at least two linear feeders including an upstream linear feeder and a downstream linear feeder, the linear feeders being disposed to transport an article from an upstream side to a downstream side in a direction of transport; a controller in charge of drive controls of the linear feeders; an upstream article detector that detects the article currently present at an upstream end of a trough of the downstream linear feeder in the direction of transport; and a downstream article detector that detects the article currently present on the downstream side relative to the upstream article detector in the direction of transport. The combination weighing device is further characterized in that the controller, when the upstream article detector is not detecting the article, drives the upstream linear feeder to operate until the article is detected, the controller drives the downstream linear feeder to operate in a manner that the article is transported toward the downstream side, and the controller starts to drive the upstream linear feeder when the article is not detected by the downstream article detector over a predetermined period of time after the controller drives the upstream linear feeder to operate until the article is detected by the upstream article detector and then suspends the operation of the upstream linear feeder.

According to the present invention, the upstream article detector is provided that detects articles at the upstream end of the trough of the downstream linear feeder. When no article is being detected by the upstream article detector, the upstream linear feeder continues to be driven until any article is detected by the upstream article detector at the upstream end of the trough of the downstream linear feeder, and the upstream linear feeder ceases to be driven when any article is detected there by the upstream article detector.

In case the articles are, for example, long and thin, the articles may partly remain being stuck out in a balanced stationary state upward above the article-incoming end of the downstream linear feeder from the article-outgoing end of the upstream linear feeder. Such an article(s) may be wrongly detected and determined by the upstream article detector as such that has been supplied from the upstream linear feeder into the downstream linear feeder. As a result of the false detection, the operation of the upstream linear feeder may be correspondingly suspended and indefinitely left inactive. This may adversely affect normal and reliable support of the articles.

In the weighing device according to the present invention, when no article is being detected by the downstream article detector over a predetermined period of time after the upstream linear feeder ceases to be driven, the upstream linear feeder starts to be driven based on the assumption that some kind of trouble associated with false detection of the upstream article detector is possibly occurring in transport of the articles. As the upstream linear feeder is thus being operated, the articles, if partly remain being stuck out in a balanced stationary state upward above the upstream end of the downstream linear feeder from the article-outgoing end of the upstream linear feeder, may be supplied into the downstream linear feeder. In this manner, normal and reliable transport of the articles may be successfully restarted, which makes it no longer necessary to assign an operator or prepare any particular means to supply any article(s) sticking out of the article-outgoing end of the upstream supply feeder into the downstream supply feeder.

3) A combination weighing device according to the present invention is provided with: at least two linear feeders including an upstream linear feeder and a downstream linear feeder, the linear feeders being disposed to transport an article from an upstream side to a downstream side in a direction of transport; a controller in charge of drive controls of the linear feeders; an upstream article detector that detects the article currently present at an upstream end of a trough of the downstream linear feeder in the direction of transport; and a downstream article detector that detects the article currently present on the downstream side relative to the upstream article detector in the direction of transport. The combination weighing device is further characterized in that the controller, when the upstream article detector is not detecting the article, drives the upstream linear feeder to operate until the article is detected by the upstream article detector, the controller, when a first predetermined period of time is passed after the upstream linear feeder starts to be driven, drives the upstream linear feeder to operate by an increased vibration strength, the controller drives the downstream linear feeder to operate in a manner that the article is transported toward the downstream side, and the controller starts to drive the upstream linear feeder to operate when the article is not detected by the downstream article detector over a second predetermined period of time after the controller drives the upstream linear feeder to operate until the article is detected by the upstream article detector and then suspends the operation of the upstream linear feeder.

The first predetermined period of time and the second predetermined period of time may preferably differ from each other or may otherwise be the same predetermined period of time.

When the first predetermined period of time is passed after the upstream linear feeder starts to be driven without any article being detected by the upstream article detector, the upstream linear feeder may be determined as receiving no article based on the assumption that the flow of articles is being disturbed on the upstream side of the upstream linear feeder, for example, the articles are blocking or being jammed at a supply port and/or its vicinity through which the articles are supplied into the upstream linear feeder. Then, the upstream linear feeder is driven by an increased vibration strength. An intensive vibration generated by the upstream linear feeder thus driven by the increased vibration strength may successfully remove the article(s) blocking or being jammed at and/or near the supply port or loosen the articles being stuck together. Thus, an operator may no longer have to remove or loosen with hand any articles being jammed or stuck together.

When the second predetermined period of time is already passed after the upstream linear feeder ceases to be driven without any article being detected by the downstream article detector, the upstream linear feeder starts to be driven based on the assumption that the article(s) that remains being stuck out in a balanced state upward above the upstream end of the downstream linear feeder from the article-outgoing end of the upstream linear feeder is wrongly detected by the upstream article detector as such that has been supplied from the upstream linear feeder into the downstream linear feeder. Then, the upstream linear feeder starts to be driven based on the assumption that some kind of trouble associated with false detection of the upstream article detector is possibly occurring in transport of the articles. Thus, any article(s) sticking out of the article-outgoing end of the upstream linear feeder may be supplied into the downstream linear feeder, and normal and reliable transport of the articles may be successfully restarted. In the event that the article(s) is sticking out of the article-outgoing end of the upstream linear feeder, an operator may no longer be required to supply such an article(s) into the downstream linear feeder.

4) The combination weighing device according to a preferred embodiment of the present invention may further include: a retaining hopper in which the article is retainable, the retaining hopper being allowed to supply the article currently retained to the upstream end of the trough of the upstream linear feeder; and a notifier controllable by the controller, the notifier being configured to notify an abnormal status in supply of the article from the retaining hopper into the trough of the upstream linear feeder. The combination weighing device may be further characterized in that the controller prompts the notifier to notify that the abnormal status is occurring in supply of the article when the article is not detected by the upstream article detector over a predetermined period of time after the upstream linear feeder starts to be driven by the increased vibration strength.

According to this embodiment, in case no article has been supplied to the upstream end of the trough of the downstream linear feeder when a predetermined period of time is already passed after the upstream linear feeder starts to be driven, the upstream linear feeder is driven to operate by an increased vibration strength based on the assumption that the flow of articles is being disturbed on the upstream side of the upstream linear feeder, for example, the articles are possibly blocking or being jammed at a supply port and/or its vicinity through which the articles are supplied into the upstream linear feeder. In case no article is still detectable over a predetermined period of time by the upstream article detector even after the upstream linear feeder is thus driven by the increased vibration strength, the notifier may be used to let an operator know that an abnormal status is occurring in supply of the articles, assuming that the articles being jammed or stuck together could not be removed or loosened even by such an intensive vibration of the upstream linear feeder driven by the increased vibration strength. The operator thus notified of the abnormal status, for example, the articles being jammed or stuck together, may be able to take an appropriate action, for example, he/she may loosen the articles being stuck together with hand.

5) The combination weighing device according to a preferred embodiment of the present invention may further include an article sensor that detects the article at the downstream end of the trough of the downstream linear feeder. The combination weighing device may be further characterized in that the controller, when the article sensor is not detecting the article, drives the downstream linear feeder to operate until the article is detected by the article sensor.

According to this embodiment, the article sensor is provided that detects any article currently present at the downstream end of the trough of the downstream linear feeder. In case no article has been detected by the article sensor, the upstream linear feeder continues to be driven until any article is detected by this article sensor. Any article(s) that has been supplied from the upstream linear feeder to the upstream end of the trough of the downstream linear feeder may be transported to the downstream end of the trough of the downstream linear feeder and then detected by the article sensor.

6) According to another embodiment of the present invention, the downstream article detector that detects the article on the downstream side relative to the upstream article detector in the direction of transport may be at least one of the article sensor and a weight sensor that measures a weight of the article in a weighing hopper disposed on the downstream side relative to the downstream linear feeder.

According to this embodiment, whether any article(s) has been supplied to the downstream side may be detectable by the article sensor that detects the article at the downstream end of the trough of the downstream linear feeder or the weight sensor that measures the article's weight in the weighing hopper on the downstream side relative to the downstream linear feeder.

7) According to yet another embodiment of the present invention, the combination weighing device may be provided with a plurality of sets of linear feeders each including at least two linear feeders that are the upstream linear feeder and the downstream linear feeder, and the plurality of sets of linear feeders being linearly arranged next to each other. The combination weighing device according to this embodiment may be further provided with a plurality of weighing units each including a supply hopper and a weighing hopper that are vertically disposed, the plurality of weighing units being linearly arranged next to each other, the supply hoppers being adapted to retain and discharge the articles supplied from the downstream linear feeders of the plurality of sets of linear feeders, the weighing hoppers being adapted to retain and weigh the articles discharged from the supply units.

According to this embodiment, the weighing units are provided that each include the supply hopper and the weighing hopper that are vertically disposed, and the weighing units are linearly arranged next to each other. Further, the plural sets of linear feeders are provided that supply the articles into the supply hoppers, and the linear feeders are linearly arranged next to each other. When an operator wants to use a greater number of weighing units to supply these supply hoppers with a broader range of articles, for example, the linear feeders and the weighing units, which are respectively linearly arranged, may be simply increased in the directions of their linear arrangement. Thus, it may become unnecessary to diametrically enlarge the dispersing feeder and thereby secure more space in all directions around this dispersing feeder. The weighing devices of this type, therefore, may be allowed to have a relatively flat and compact structure.

Effects of the Invention

According to the present invention, when there is currently no article at the upstream end of the trough of the downstream linear feeder, the upstream linear feeder is driven to operate until any article is detected by the upstream article detector. In case no article has been detected by the upstream article detector when a predetermined period of time is already passed after the upstream linear feeder starts to be driven, the upstream linear feeder may be determined as receiving no article based on the assumption that the flow of articles is being disturbed on the upstream side of the upstream linear feeder, for example, the articles are possibly blocking or being jammed at a supply port and/or its vicinity through which the articles are supplied into the upstream linear feeder. Then, the upstream linear feeder is driven to operate by an increased vibration strength. An intensive vibration generated by the upstream linear feeder thus driven by the increased vibration strength may successfully remove the article(s) blocking or being jammed at and/or near the supply port or loosen the articles being stuck together. Thus, an operator may no longer have to remove or loosen with hand any articles being jammed or stuck together.

The upstream linear feeder continues to be driven until any article is detected by the upstream article detector disposed to detect the article currently present at the upstream end of the trough of the downstream linear feeder, and the upstream linear feeder ceases to be driven when any article is detected by the upstream article detector. During the operation, the articles may partly remain being stuck out in a balanced stationary state upward above the upstream end of the downstream linear feeder from the article-outgoing end of the upstream linear feeder, and such an article(s) may be wrongly detected by the upstream article detector as such that has been supplied from the upstream linear feeder into the downstream linear feeder. In this instance, the upstream linear feeder starts to be driven, and the article(s) that remains being stuck out in a balanced stationary state upward above the upstream end of the downstream linear feeder from the article-outgoing end of the upstream linear feeder may be accordingly transported to the downstream linear feeder. As a result, normal and reliable transport of the articles may be successfully restarted, and an operator may no longer be required to supply such an article(s) into the downstream linear feeder.

BRIEF DESCRIPTION OF THE DRAWINGS

FIG. 6 is a schematic side view of the device illustrated in part in the vicinity of linear feeders and weighing units.

DESCRIPTION OF EMBODIMENTS

Embodiments of the present invention are hereinafter described in detail with reference to the accompanying drawings.

Figure 1:
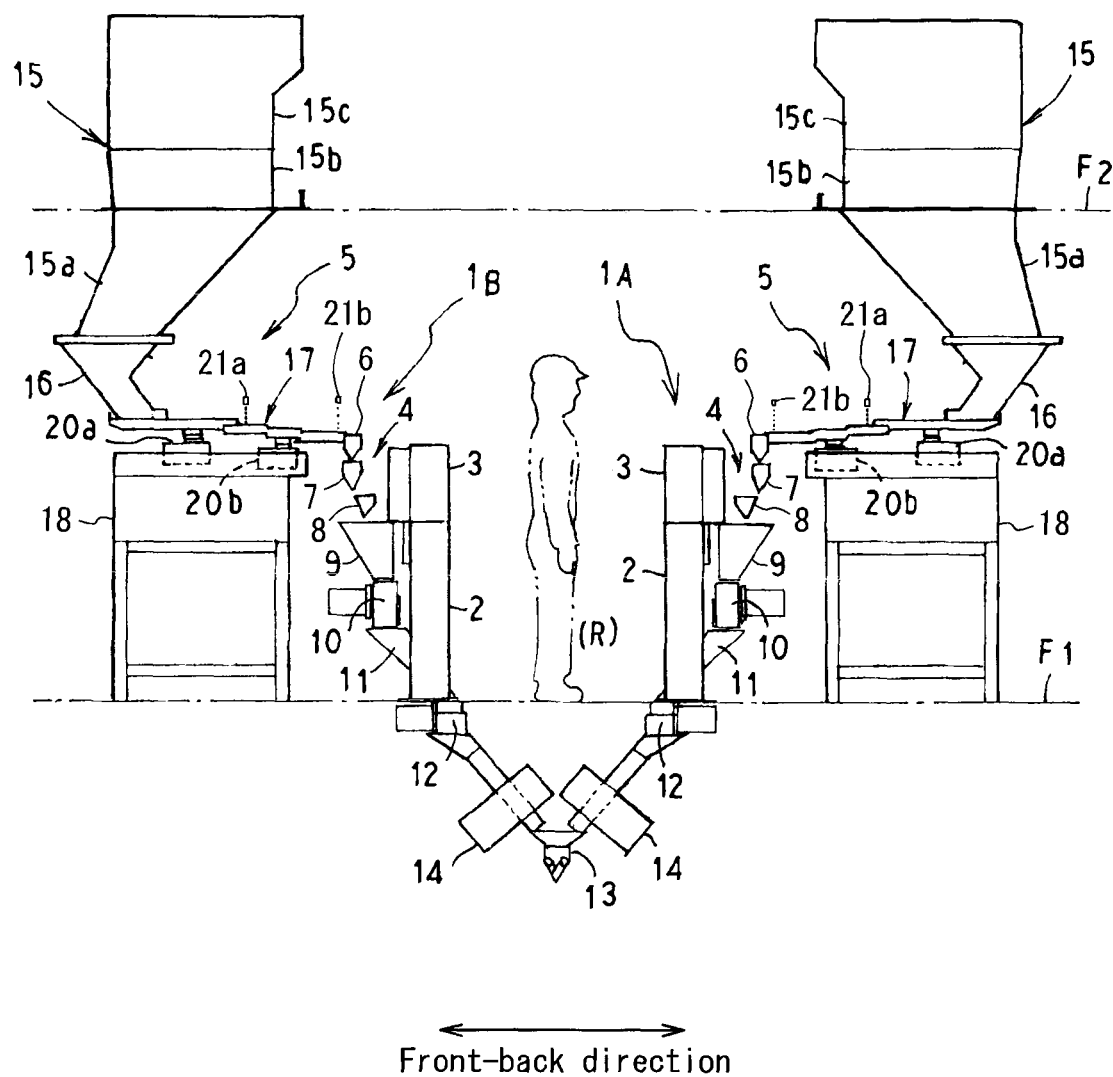
FIG. 1 is a schematic side view of a combination weighing device according to an embodiment of the present invention.
Figure 2:
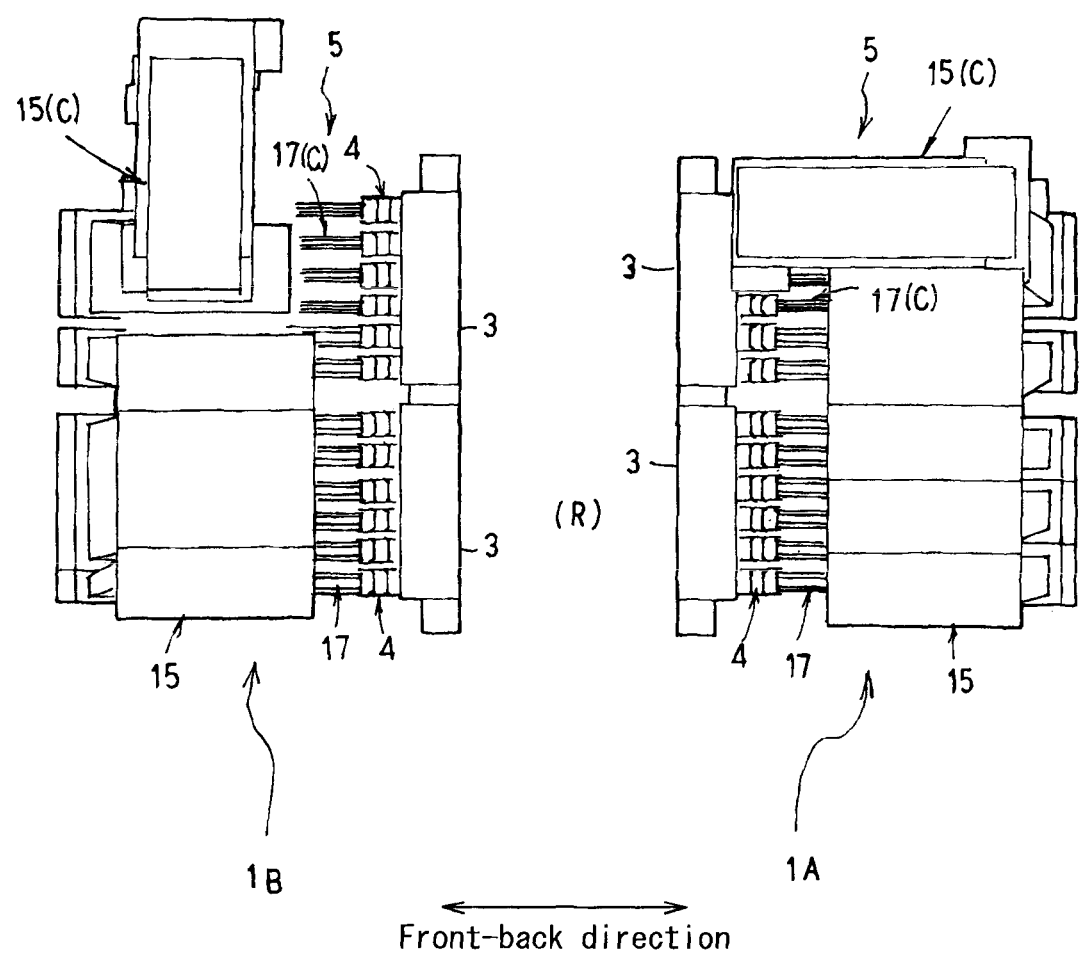
FIG. 2 is a schematic plan view of the combination weighing device illustrated in FIG. 1.
Figure 3:
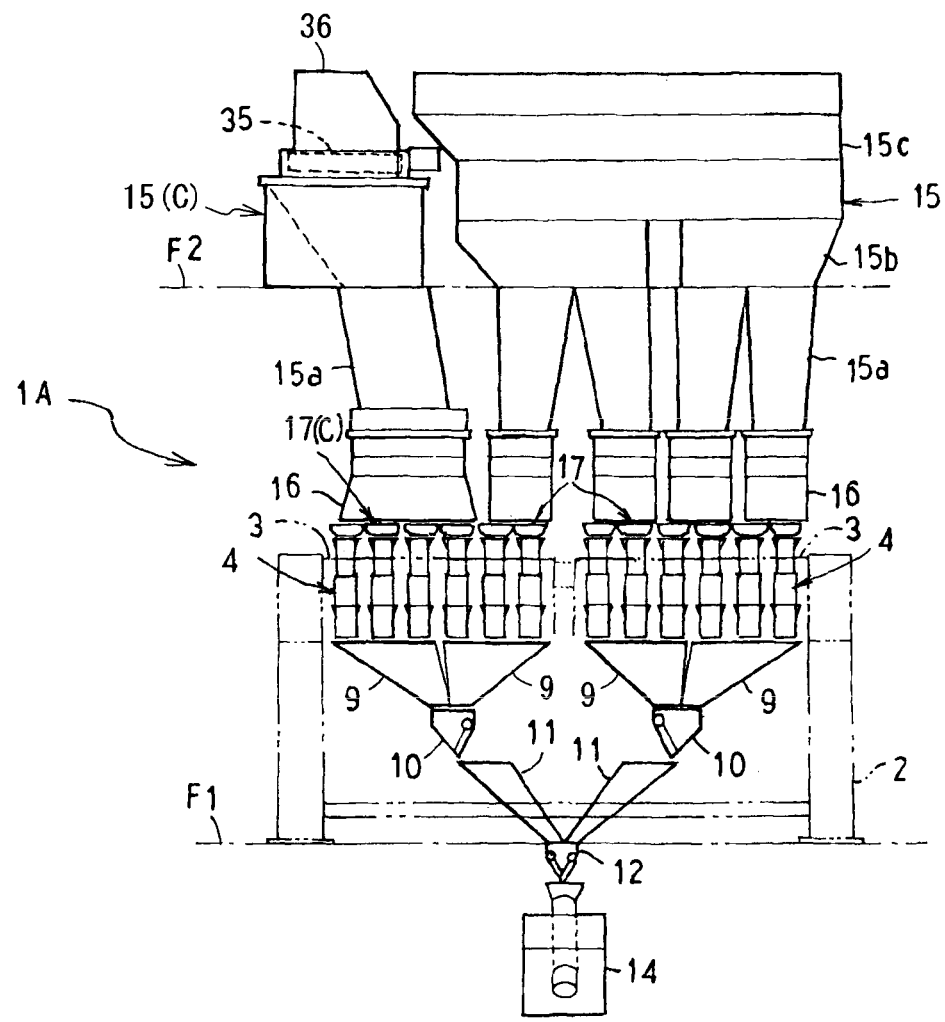
FIG. 3 is a schematic front view of one of weighing devices illustrated in FIG. 1.
Figure 4:
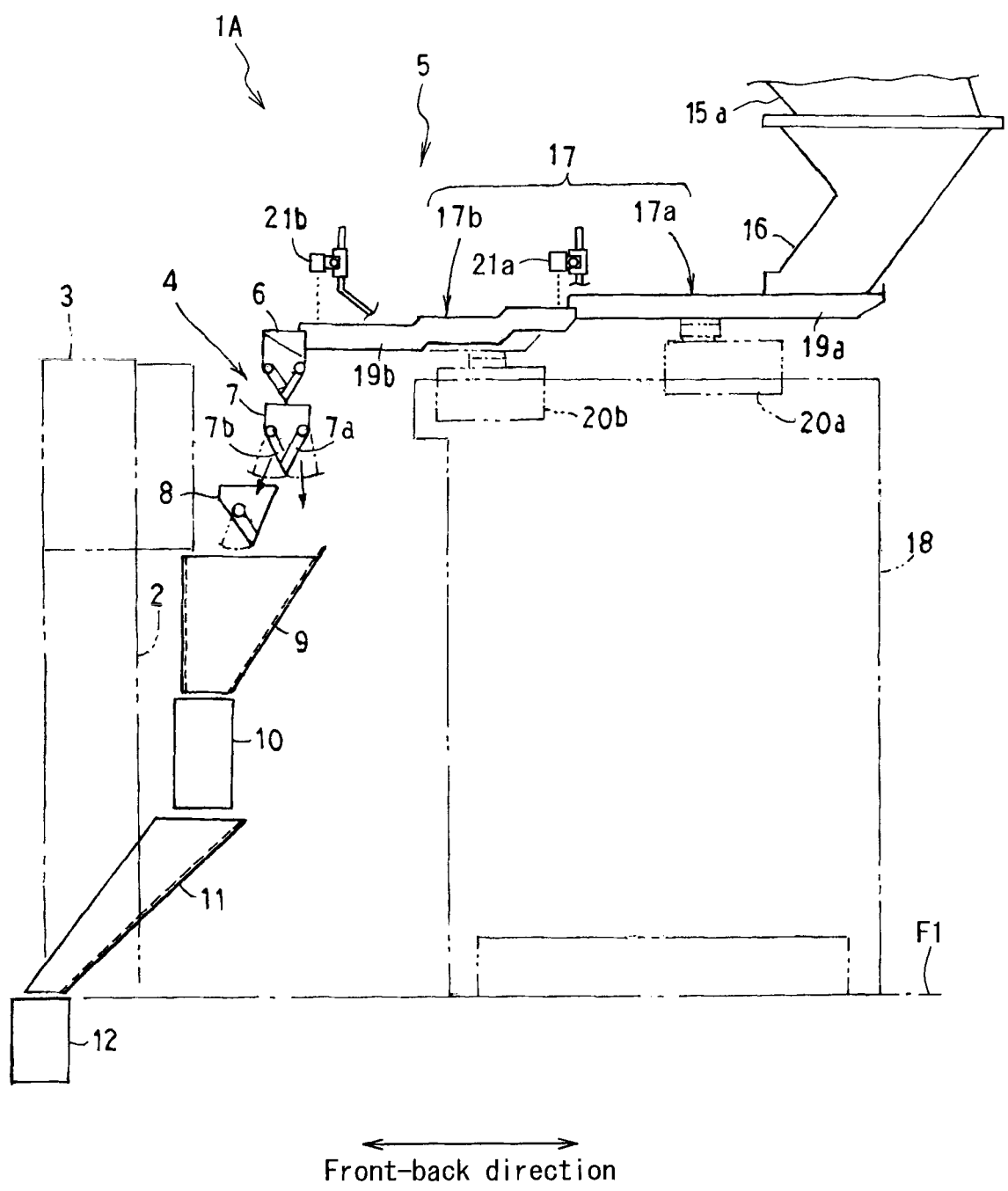
FIG. 4 is a side view of principal components of the weighing device illustrated in FIG. 3.

FIG. 1 is a side view of a combination weighing device according to an embodiment of the present invention. FIG. 2 is a plan view of the combination weighing device. FIG. 3 is a schematic front view of one of weighing devices illustrated in FIG. 1. FIG. 4 is a schematic side view of principal components of the weighing device illustrated in FIG. 3.

The combination weighing device according to this embodiment is for use in mixing and weighing predetermined quantities of articles that range in a wide variety, for example, eight kinds of articles such as food stuffs including sweets. More specifically, this combination weighing device may be suitably used to mix and weigh, for example, snacks to go with alcohol drinks in which nuts, bean snacks and/or cubic rice crackers are mixed into pouches with one or two small fishes cooked in mirin (sweet sake).

This combination weighing device is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combinatorial weighing device, a front-back direction is hereinafter used to refer to the transverse direction on FIGS. 1, 2 and 4, and the direction from the near to far side on the drawing of FIG. 3. Further, a lateral direction is hereinafter used to refer to the direction from the near to far side on the drawings FIGS. 1 and 4, and the transverse direction on FIG. 3

As illustrated in FIGS. 1 and 2, the combination weighing device includes a pair of weighing devices 1A and 1B. These weighing devices 1A and 1B are disposed on the front and back sides so as to face each other, with a central passage R being interposed therebetween. An operator of these weighing devices is allowed to move laterally, from right to left and vice versa, through this central passage R. The weighing devices 1A and 1B are essentially configured likewise, structural features of which are hereinafter described.

On the inner sides of the weighing devices 1A and 1B (on the sides of the central passage R), two bases 3, which are long members in the lateral direction, are each disposed on a support frame 2 and thereby stands to a predetermined height. On the outer sides of the bases 3 (on the sides opposite to the central passage R), multiple weighing units 4 are disposed in a row in the lateral direction. In the illustrated example, the weighing devices 1A and 1B are each equipped with 12 weighing units 4 that are lined up in a row. A wide variety of articles may be successfully mixed and weighed with these 24 weighing units 4, in total, of the weighing devices 1A and 1B.

An article supplier 5 is disposed on the outer side of the weighing units 4. The article supplier 5 supplies various kinds of articles to be weighed to positions above the weighing units 4.

The weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3 as in the known art. In the base 3 are housed such devices as weight sensors used to measure the weights of the hoppers 6, 7, and 8, and mechanisms to open and close the gates of these hoppers.

As illustrated in FIG. 4, the weighing hopper 7 has, at its lower end, an outer gate 7a and an inner gate 7b that are adapted to independently open and close. When the outer gate 7a alone is oscillated to open, the weighed articles are discharged into a first collection chute 9. When the inner gate 7b alone is oscillated to open, the weighed articles are discharged into and retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Two second collection chutes 11 are disposed at positions below the first collection hoppers 10. These second collection chutes 11 guide and collect the articles dropping downward from the first collection hoppers 10. In a respective one of the weighing devices 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing devices 1A and 1B. This final collection hopper 13 is opened and closed in response to a supply request instruction outputted from the packaging apparatus. A metal detector 14 is disposed in a guiding path through which the articles dropping downward from the second collection hopper 12 into the final collection hopper 13. The metal detector 14 monitors whether the articles are contaminated with any metallic foreign matter.

The article supplier 5 has retaining tanks 15 in which the articles are retainable, and retaining hoppers 16 continuous to lower ends of the retaining tanks 15. The article supplier 5 further has 12 supply feeders 17. The supply feeders 17 are disposed next to each other in the lateral direction at positions above a support table 18. The supply feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b.

As illustrated in FIGS. 2 and 3, a retaining tank 15(C), which is configured differently to the other tanks, is also provided in order to supply sticky articles, for example, small rice crackers or small fishes cooked in mirin (sweet sake). This retaining tank 15(C) is equipped with a belt conveyer 35, as illustrated in FIG. 3. By rotating the belt conveyer 35, the articles retained in an upper tank 36 are transported and dropped downward into the retaining hopper 16 through the lower-stage tank 15a.

As illustrated in FIG. 4, the supply feeder 17 includes two linear feeders; an upstream linear feeder 17a, and a downstream linear feeder 17b. The upstream linear feeder 17a and the downstream linear feeder 17b are disposed in tandem, with the upstream linear feeder being located higher than the other, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18.

The articles thrown out of the retaining hopper 16 into the upstream linear feeder 17a are vibrationally transported into the downstream linear feeder 17b. Then, the articles are thrown, by a small amount at a time, out of the article-outgoing end of the downstream linear feeder 17b into the supply hopper 6 of the weighing unit 4.

An upstream article sensor 21a and a downstream article sensor 21b are disposed at positions above the supply feeder 17. These article sensors 21a and 21b may detect, using, for example, laser, heights of the articles piled up at the upstream article-incoming end and the downstream article-outgoing end of the lower-stage linear feeder 17b. The linear feeders 17a and 17b are driven to operate, as described later, based on information of article detection outputted from the article sensors 21a and 21b.

Figure 5:
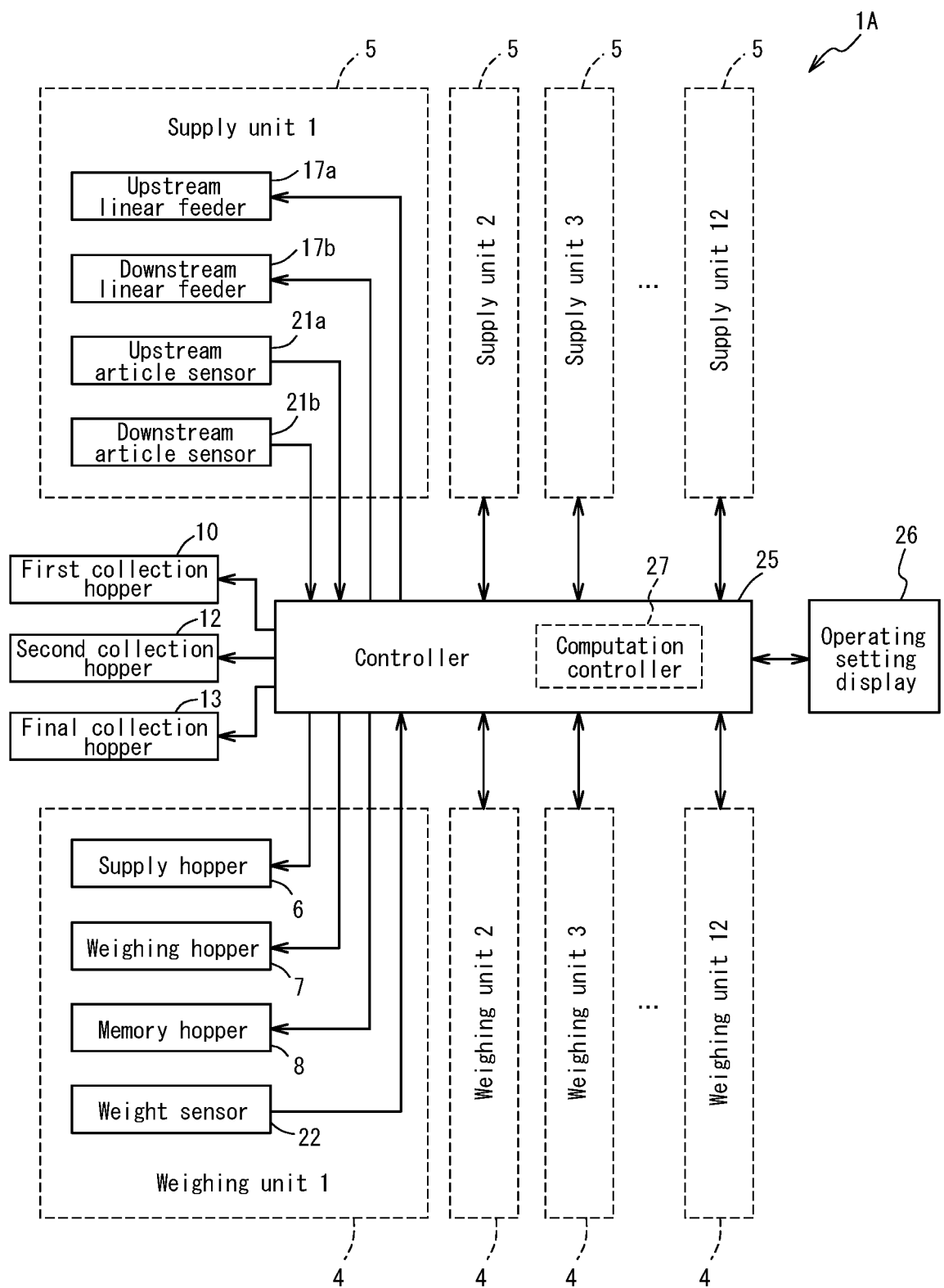
FIG. 5 is a control block diagram of principal components in one of the weighing devices; a combination weighing device 1A, illustrated in FIG. 1.

FIG. 5 is a control block diagram of principal components in the combination weighing device 1A; one of the weighing devices according to this embodiment. The weighing device 1A and the other weighing device 1B are essentially configured likewise. This weighing device 1A, therefore, is typically illustrated in this drawing. In FIG. 5, principal components of the article supplier 5 that supplies a respective one of the weighing units 4 with articles are collectively illustrated as a supply unit.

A controller 25 that controls the components and units of the combination weighing device is housed in the base 3. The controller 25 is connected to an operation setting display 26 on which operation settings for the weighing device 1A are displayable, for example, parameters and measured values. To the controller 25 are inputted results of detection outputted from the upstream and downstream article sensors 21a and 21b of the supply units and weight signals outputted from weight sensors 22 that measure weights of the weighing hoppers 7. The controller 25 is in charge of drive controls of the upstream and downstream linear feeders 17a and 17b of the supply units, and also opens and closes the discharge gates of the hoppers 6, 7, 8, 10, 12 and 13.

In this embodiment, the weighing devices 1A and 1B are connected to each other with a LAN cable. An operator, by manipulating the operation setting display 26, can selectively set which one of the weighing devices 1A and 1B should be the main device. When the weighing device 1A is set as the main device, for example, a computation controller 27 of the controller 25 in the main weighing device 1A executes combinatorial computations based on weights of the articles in the hoppers 7 and 8; 24 hoppers in total, of the weighing devices 1A and 1B, and then prompts the weighing hoppers 7 and the memory hoppers 8 of the weighing device 1A, 1B, which were determined and selected as an optimal combination by the combinatorial computations, to discharge the articles.

FIG. 6 is a schematic side view that illustrates the combination weighing device in part in the vicinity of the linear feeders 17a and 17b and the weighing units 4.

As described earlier, the upstream article sensor 21a is disposed at a position above the upstream article-incoming end of the trough 19b of the downstream linear feeder 17b. This article sensor detects, with laser, the articles supplied into the trough 19b of this downstream linear feeder. Further, the downstream article sensor 21b is disposed at a position above the downstream article-outgoing end of the trough 19b of the downstream linear feeder 17b. This article sensor detects, with laser, the articles at the article-outgoing end of the trough 19 of this downstream linear feeder.

The articles in the retaining hopper 16 are discharged, through vibration generated by the upstream linear feeder 17a, into the trough 19a of the upstream linear feeder 17a and are further vibrationally transported toward the downstream side in the direction of transport. Then, the articles are transported out of the article-outgoing end of the trough 19a of the upstream linear feeder 17a, arriving at the article-incoming end of the trough 19b of the downstream linear feeder 17b. The articles that arrived at the article-incoming end of the trough 19b of the downstream linear feeder 17b are then transported to the article-outgoing end of the trough 19b of the downstream linear feeder 17b. In response to the output of an instruction to transport the articles to the supply hopper 6, the articles at the article-outgoing end of the trough 19b are discharged into the supply hopper 6. The articles in the supply hopper 6 are thrown into the weighing hopper 7, and the articles, after being weighed by the weight sensor 22, are discharged out of the weighing hopper 7 into the memory hopper 8 or into the first collection chute 9.

Next, drive controls of the upstream linear feeder 17a and the downstream linear feeder 17b are hereinafter described with reference to FIGS. 7A and 7B in which FIG. 6 is illustrated in part.

Figure 7A:
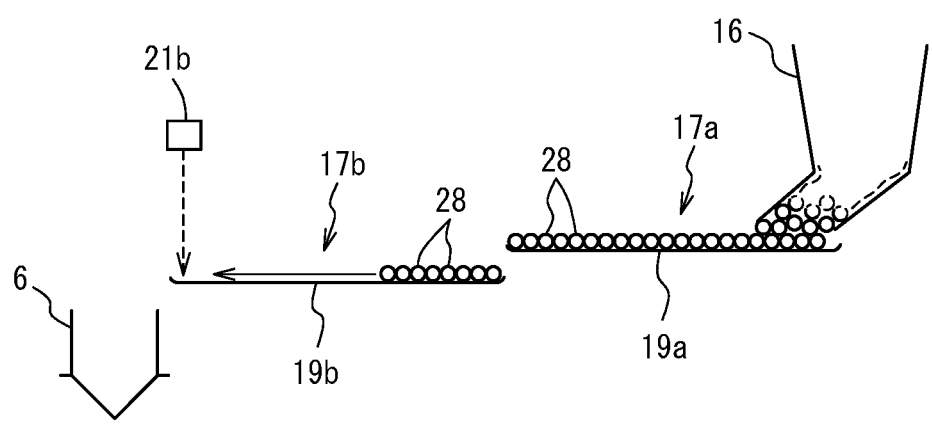
FIG. 7A is a side view of FIG. 6 illustrated in part to describe drive controls of the linear feeder.

When no article 28 is being detected at the downstream article-outgoing end of the trough 19b of the downstream linear feeder 17b by the downstream article sensor 21b, i.e., when there is no article 28 currently present at the downstream end of the trough 19b, as illustrated in FIG. 7A, the downstream linear feeder 17b is driven to operate until any article 28 is detected by the downstream article sensor 17b. The articles 28 are thus transported to the downstream end of the trough 19b.

When any article 28 is being detected at the downstream end of the trough 19 of the downstream linear feeder 17b by the downstream article sensor 21b, i.e., when any article 28 is found to be currently present at the downstream end of the trough 19b, the downstream linear feeder 17b starts to be driven in response to the output of an instruction to transport the articles to the supply hopper 6. The articles 28 at the downstream end of the trough 19 are thus discharged into the supply hopper 6.

Figure 7B:
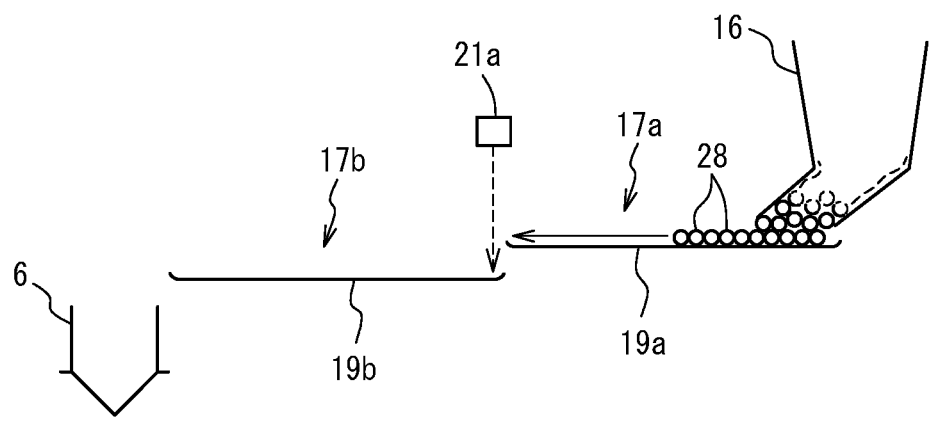
FIG. 7B is a side view of FIG. 6 illustrated in part to describe drive controls of the linear feeders.

When no article 28 is being detected at the upstream article-incoming end of the trough 19b of the downstream linear feeder 17b by the upstream article sensor 21a, i.e., when there is no article 28 currently present at the upstream end of the trough 19b, as illustrated in FIG. 7B, the upstream linear feeder 17a is driven to operate until any article 28 is detected by the upstream article sensor 17a. The articles 28 in the trough 19a of the upstream linear feeder 17a are thus transported into the trough 19b of the downstream linear feeder 17b. The upstream linear feeder 17a ceases to be driven when the articles 28 are supplied into the trough 19b of the downstream linear feeder 17b and are detected at the upstream end of the trough 19b by the upstream article sensor 21a.

Thus, the articles in the retaining hopper 16 are transported by the linear feeders 17a and 17b from the upstream side toward the downstream side and are thrown into the supply hopper 6 of the weighing unit 4. The supply of articles thus normally done, however, may be difficult to perform at times under certain circumstances.

Such possible failures of articles to be normally transported are hereinafter described.

Figure 8A:
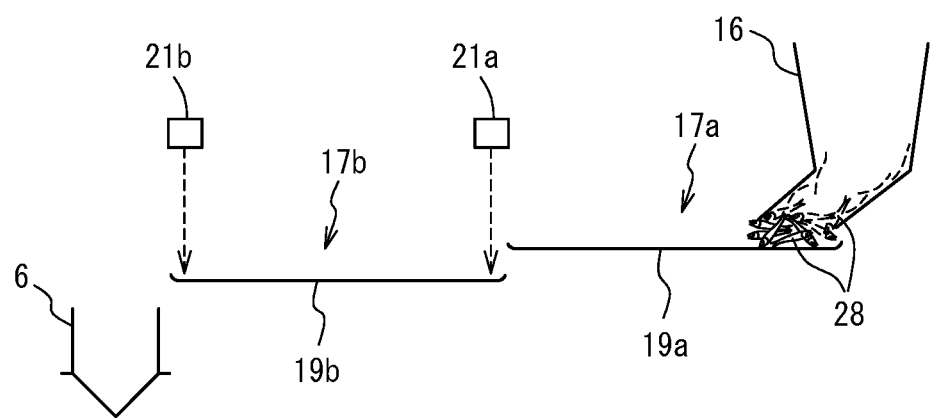
FIG. 8A is a side view of FIG. 6 illustrated in part to describe an abnormal status in supply of articles using the linear feeders.

As illustrated in FIG. 8A; a drawing corresponding to FIG. 7A, certain types of articles, for example, long and thin articles 28 like small fishes, may often block the supply port of the retaining hopper 16, failing to be smoothly transported into the trough 19a of the upstream linear feeder 17a, or such articles may often be immovably stuck together in the retaining hopper 16. These events, if they occur, may possibly disturb smooth transport of the articles 28 into the trough 19a of the upstream linear feeder 17a As describe earlier, the upstream linear feeder 17a continues to be driven until any article is detected by the upstream article sensor 21a at the upstream end of the trough 19b of the downstream linear feeder 17b, and the upstream linear feeder 17a ceases to be driven when any article is detected by the upstream article sensor 21a. Therefore, false detection by the upstream article sensor 21a may render the upstream linear feeder 17a indefinitely inactive. As a result, the downstream linear feeder 17b may fail to receive any article.

Figure 8B:
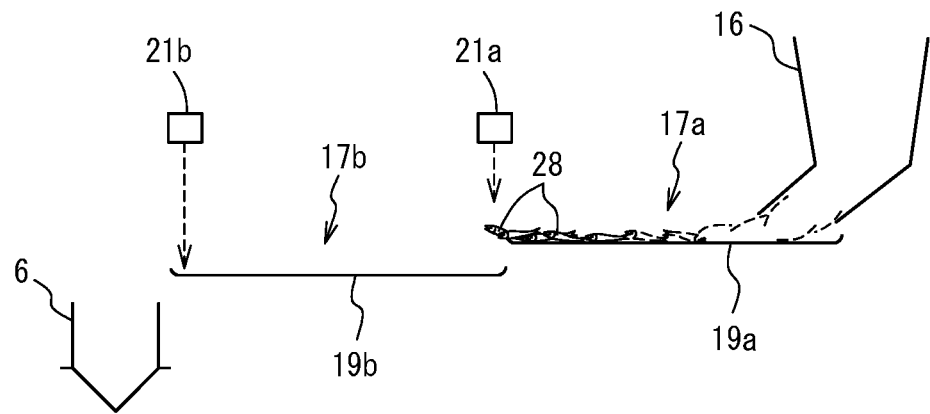
FIG. 8B is a side view of FIG. 6 illustrated in part to describe an abnormal status in supply of articles using the linear feeders.

As illustrated in FIG. 8b, the articles 28, if they are long and thin like small fishes or bar-shaped items, may be likely to partly stick out of the downstream end, from which the articles are discharged, of the trough 19a of the upstream linear feeder 17a. The articles 18 thus sticking out of the downstream end may be wrongly detected by the upstream article sensor 21a as such that have been supplied to the upstream end of the trough 19b, and the upstream linear feeder 17a may correspondingly cease to be driven.

When the upstream linear feeder 17a ceases to be driven, the articles 28 partly sticking out of the discharge end of the trough 19a of the upstream linear feeder 17a may be anchored by the subsequent article(s) 28 and remain being stuck out in a balanced stationary state. Such an article(s) 28 may be wrongly detected indefinitely by the upstream article sensor 21a, despite the fact that the upstream end of the trough 19b of the downstream linear feeder 17b is yet to be supplied with any article 28. Then, the upstream linear feeder 17a may be rendered indefinitely inactive without the false detection been corrected, and the downstream linear feeder 17a may no longer be supplied with any article.

It may be suggested to relocate the upstream article sensor 21a to a more downstream position in the direction of transport in order to avoid possible false detection of the article(s) 28 sticking out of the discharge end of the trough 19a of the upstream linear feeder 17a. While the upstream linear feeder 17a should start to be driven to supply the articles into the downstream linear feeder 17b when the articles are no longer detected by the upstream article sensor 21a, the operation of the upstream linear feeder 17a does not start until the upstream article sensor now located at a more downstream position no longer detects any article.

Because the timing of starting to drive the upstream linear feeder 17a is thus delayed, continuous supply of the articles may not be possible, causing intervals between the articles being transported. The downstream end of the downstream linear feeder 17b may be left empty without any article being supplied, and the supply hopper 6 may accordingly fail to receive any article from the downstream linear feeder 17b. Thus, weighing cycles are generated, in which no article is suppliable from the supply hopper 6 into the weighing hopper 7. As a result, fewer hoppers than expected may only be available for combinatorial computations, resulting in a poor combinational accuracy, or the combinatorial computations per se may become impossible, inviting a poor production yield.

The upstream article sensor 21a, therefore, may preferably be disposed in the vicinity of the upstream end of the trough 19b of the downstream linear feeder 17b, so that any article that arrived at the upstream end of the trough 19b of the downstream linear feeder 17b is immediately detectable by this article sensor.

This embodiment provides the following technical features to automatically clear possible troubles in supply of the articles resulting from, as described earlier, the articles being jammed or false detection by the upstream article sensor 21a.

The description given below starts with the drive control of the upstream linear feeder 17a in case the articles are blocking a supply port and/or its vicinity or when the articles are immovably being stuck together in the retaining hopper 16.

When no article is being detected by the upstream article sensor 21a at the upstream end of the trough 19b of the downstream linear feeder 17b, i.e., when there is currently no article at the upstream end of the trough 19b of the downstream linear feeder 17b, the upstream linear feeder 17a continues to be driven until any article is detected by the upstream article sensor 21a.

In case no article is still detectable by the upstream article sensor 21a at the upstream end of the trough 19b of the downstream linear feeder 17b when a predetermined period of time that has been previously set is already passed after the upstream linear feeder 17a starts to be driven, it may be determined that the articles are blocking or being jammed at the supply port and/or its vicinity of the retaining hopper or the articles are immovably being stuck together in the retaining hopper without any article being supplied into the upstream linear feeder 17a. In this instance, the vibration strength of the upstream linear feeder 17a is increased to a predetermined vibration strength that has been previously set, and the upstream linear feeder 17a is driven to operate by this increased vibration strength. The vibration strength may be changed to and set at different levels of strength in stages by manipulating the operation setting display 26. How many levels and stages of change should suitably be set for the vibration strength may be decided in advance depending on, for example, properties of the articles to be weighed.

An intensive vibration generated by the trough 19a of the upstream linear feeder 17a thus driven by the increased vibration strength may successfully remove any article(s) blocking or being jammed at the supply port and/or its vicinity. Otherwise, such an intensive vibration may be transmitted to the retaining hopper 16, in which case the articles that are immovably being stuck together in the retaining hopper 16 may be loosened and pulled apart from each other by the transmitted vibration.

Any article(s) blocking or being jammed at the supply port or its vicinity or being immovably stuck together in the retaining hopper 16 may be removed or loosened by such an intensive vibration strength, and an operator may no longer be required to remove or loosen with hand any articles being jammed or stuck together. Thus, unmanned automatic operation of the weighing device may be continued for long hours.

The upstream linear feeder 17a continues to be driven by this increased vibration strength until the articles are no longer jammed or stuck together and are transported by the upstream linear feeder 17a to the upstream end of the trough 19b of the downstream linear feeder 17b and then detected by the upstream sensor 21a. Otherwise, the upstream linear feeder 17a continues to be driven by this increased vibration strength over a predetermined period of time that has been previously set. When no article is still detectable by the upstream article sensor 21a at the upstream end of the trough 19b of the downstream linear feeder 17b when a predetermined period of time that has been previously set is already passed after the upstream linear feeder 17a starts to be driven by the increased vibration strength, it may be determined that the articles being jammed or being stuck together cannot be removed or loosened. In this instance, the articles being jammed, i.e., an abnormal status in supply of the articles, is displayed on the operation setting display 26, notifying an operator of the current status; the articles being jammed cannot be removed or loosened by the upstream linear feeder 17a driven by the increased vibration strength.

An operator is not only notified of such an abnormal status resulting from the articles being jammed but is also notified when, for example, he/she forgot to supply the articles, leaving the retaining hopper 16 empty.

The means for notifying the operator is not necessarily limited to information displayed on the operation setting display 26. The notifying means may be selected from alarming sound, indicating light, or the sound and light being combined.

Next is described the drive control of the upstream linear feeder 17a when the article(s) sticking out of the discharge end of the trough 19a of the upstream linear feeder 17a is wrongly detected by the upstream article sensor 21a.

When the article(s) sticking out of the discharge end of the trough 19a of the upstream linear feeder 17a is detected by the upstream article sensor 21a, the upstream linear feeder 17a ceases to be driven, assuming that the upstream end of the trough 19b of the downstream linear feeder 17b has been supplied with the article(s).

When no article is detectable by the downstream article sensor 21b at the downstream end of the trough 19b of the downstream linear feeder 17b over a predetermined period of time that has been previously set after the upstream linear feeder 17a ceases to be driven, false detection may be determinable against any article being detected by the upstream article sensor 21a. In this case, the upstream article sensor 21a starts and continues to be driven over a period of time that has been previously set. This preset period of time may be an optional period of time long enough to discharge the articles at the discharge end of the trough 19a of the upstream linear feeder 17a into the trough 19b of the downstream linear feeder 17b.

As a result of the upstream linear feeder 17a being driven, the article(s) that remains being stuck in a balanced state out of the discharge end of the trough 19a of the upstream linear feeder 17a may fall onto the upstream end of the trough 19b of the downstream linear feeder 17b. The article(s) at the upstream end of the trough 19b of the downstream linear feeder 17b is then transported to the downstream end of the trough 19b of the downstream linear feeder 17b. When any article is no longer detected by the upstream article sensor 21a at the upstream end of the trough 19b of the downstream linear feeder 17b, the upstream linear feeder 17b starts to be driven.

Any trouble in transport of the articles caused by false detection of the upstream article sensor 21a may be automatically cleared as described so far. Thus, unmanned automatic operation of the weighing device may be continued for long hours.

As described above, the upstream linear feeder 17a starts to be driven when no article is detectable by the downstream article sensor 21b at the downstream end of the trough 19b of the downstream linear feeder 17b over a predetermined period of time that has been previously set. Optionally, the downstream article sensor 21b may be replaced with the weight sensor 22 that measures the weight of the weighing hopper 7 to be supplied with articles through the downstream linear feeder 17b and the supply hopper 6. In this instance, the upstream linear feeder 17a may start to be driven when the weighing hopper 7 is detected by this weight sensor 22 as empty without the articles being supplied over a predetermined period of time that has been previously set.

The operations of the linear feeders according to this embodiment are hereinafter described with reference to the flow charts of FIGS. 9 to 12.

Figure 9:
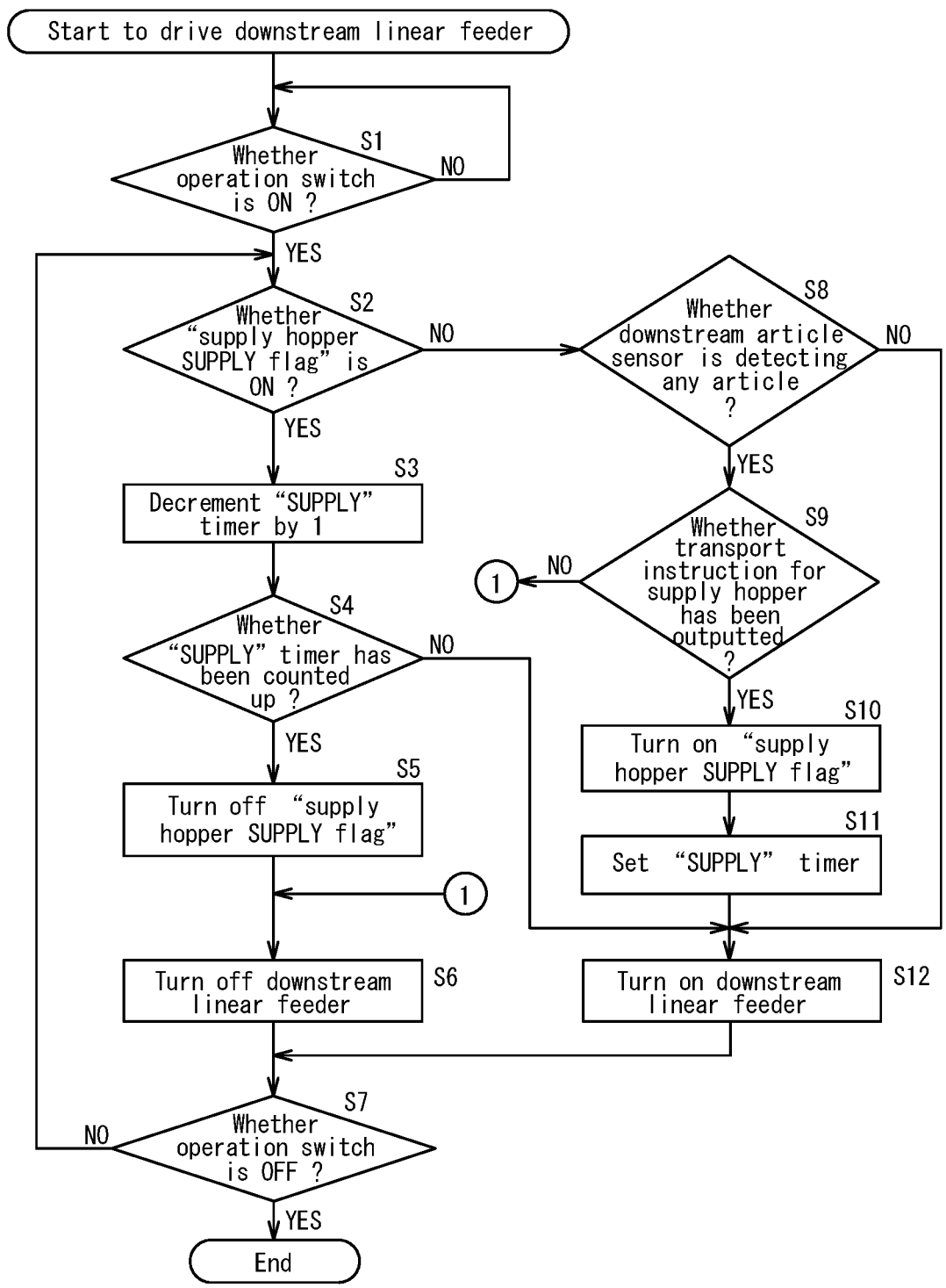
FIG. 9 is a flow chart illustrating steps of an exemplified control process executed by a downstream linear feeder.
Figure 10:
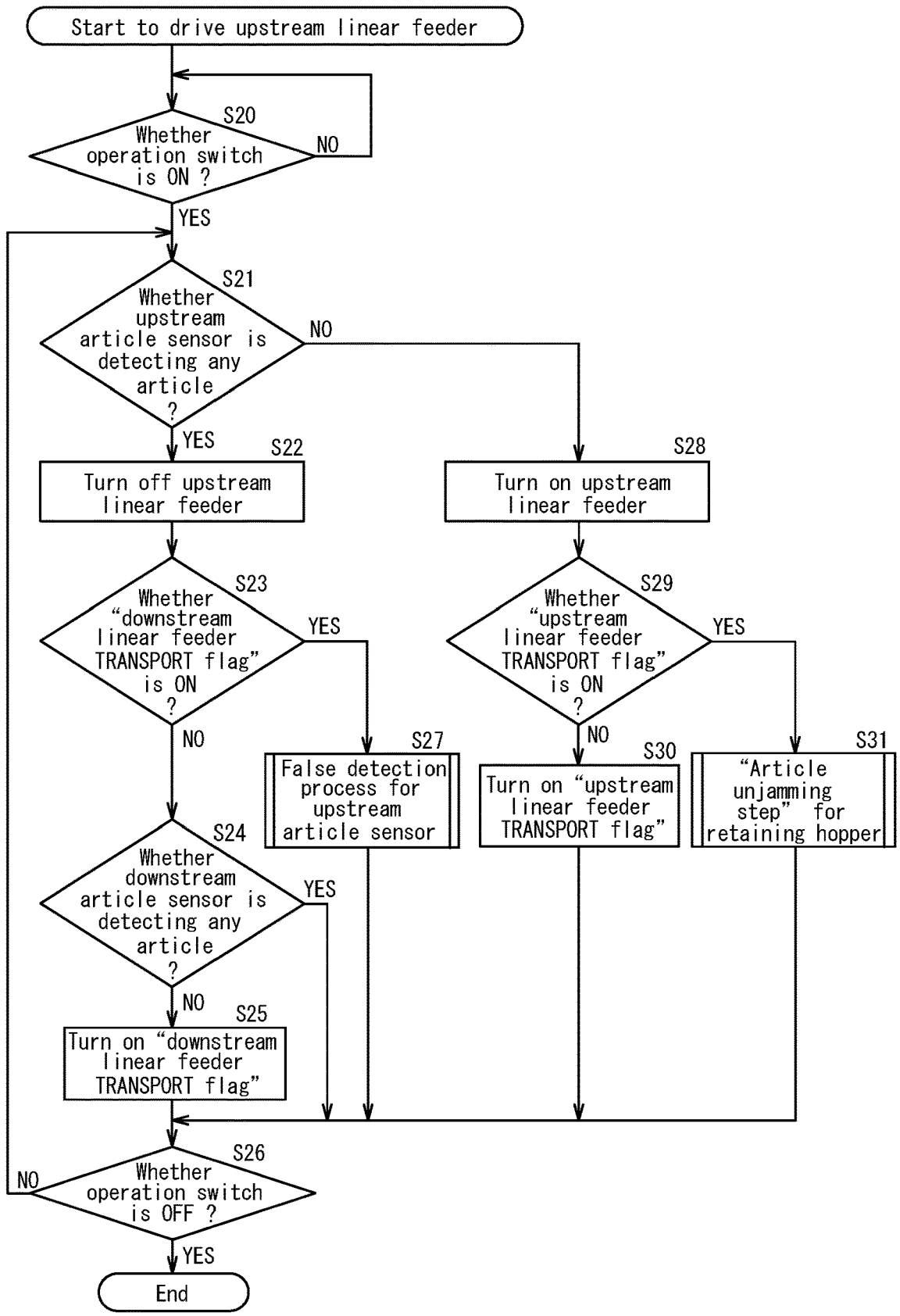
FIG. 10 is a flow chart illustrating steps of an exemplified control process executed by an upstream linear feeder.

FIG. 9 is a flow chart illustrating steps of an exemplified control process executed by the downstream linear feeder 17b. FIG. 10 is a flow chart illustrating steps of an exemplified control process executed by the upstream linear feeder 17a. In these drawings are illustrated programs that are both executed at certain time intervals, for example, per 10 msec.

To start with, when an operation switch is determined as ON (Step S1), as illustrated in FIG. 9, it is determined whether the following flag has been turned on; a "supply hopper SUPPLY flag" indicating that the supply hopper 6 is currently supplied with articles (Step S2). When Step S2 determines that the "supply hopper SUPPLY flag" is ON, which indicates that the articles are currently supplied, the count value of a "SUPPLY" timer that measures the duration of ongoing supply is decremented by "1" (Step S3), and it is determined whether the "SUPPLY" timer has been counted up (Step S4). When Step S4 determines that the "SUPPLY" timer has been counted up, which indicates that supply of the articles into the supply hopper 6 is over, the "supply hopper SUPPLY flag" is turned off (Step S5), and the downstream linear feeder 17b ceases to be driven (turned off). Then, the control process proceeds to Step S7 (Step S6). In Step S7, it is determined whether the operation switch has been turned off. When Step S7 determines that the operation switch has not been turned off, the control process returns to Step S2 (Step S7).

When Step S2 determines that the "supply hopper SUPPLY flag" is not ON, it is determined whether any article is being detected by the downstream article sensor 21b (Step S8). When Step S8 determines that any article is being detected, it is determined whether an instruction to transport the articles into the supply hopper 6 has been outputted (Step S9). Without the instruction to transport the articles into the supply hopper 6, the control process proceeds to Step S6.

When Step S9 determines that the instruction to transport the articles into the supply hopper 6 has been outputted, the "supply hopper SUPPLY flag" is turned on, and the control process proceeds to Step S11 (Step S10). In Step S11, the "SUPPLY" timer is set. Then, the downstream linear feeder 17b starts to be driven (turned on) (Step S12). Then, the control process proceeds to Step S7.

When Step S8 determines that no article is being detected by the downstream article sensor 21b, the control process proceeds to Step S12, in which the downstream linear feeder 17b starts to be driven in order to transport the articles to the downstream end of the trough 19b of the downstream linear feeder 17b.

The control process for the upstream linear feeder 17a illustrated in FIG. 10 is hereinafter described. When the operation is determined as ON (Step S20), it is determined whether any article is being detected by the upstream article sensor 21a (Step S21). When Step S21 determines that any article is being detected, the upstream linear feeder 17a ceases to be driven (OFF) (Step S22). Then, it is determined whether the following flag is ON; a "downstream linear feeder TRANSPORT flag", indicating ongoing transport of the articles by the downstream linear feeder 17b (Step S23).

When Step S23 determines that the "downstream linear feeder TRANSPORT flag" is not ON, the control process proceeds to Step S24.

It is determined in Step S24 whether any article is being detected by the downstream article sensor 21b. When no article is being detected by the downstream article sensor 21b, the "downstream linear feeder TRANSPORT flag", which indicates ongoing transport of the articles by the downstream linear feeder 17b, is turned on (Step S25). The control process returns to Step S21 when it is determined that the operation switch has not been turned off (Step S26).

When Step S23 determines that the downstream linear feeder 17b TRANSPORT flag" is ON, the control process proceeds to a false detection process for the upstream article sensor 21a (Step S27). Then, the control process returns to Step S26.

When Step S21 determines that no article is being detected by the upstream article sensor 21a, the upstream linear feeder 17a starts to be driven (ON) in order to supply the articles to the upstream end of the trough 19b of the downstream linear feeder 17b (Step S28). Then, the control process proceeds to Step S29. It is determined in Step S29 whether the following flag is ON; an "upstream linear feeder TRANSPORT flag" indicating that the articles are currently transported by the upstream linear feeder 17a. When Step S29 determines that the "upstream linear feeder TRANSPORT flag" is not ON, the "upstream linear feeder TRANSPORT flag" is turned on, and the control process proceeds to Step S26 (Step S30). When Step S29 determines that the "upstream linear feeder TRANSPORT flag" is ON, the control process proceeds to an article unjamming step for the retaining hopper 16 (Step S31). Then, the control process returns to Step S26.

Figure 11:
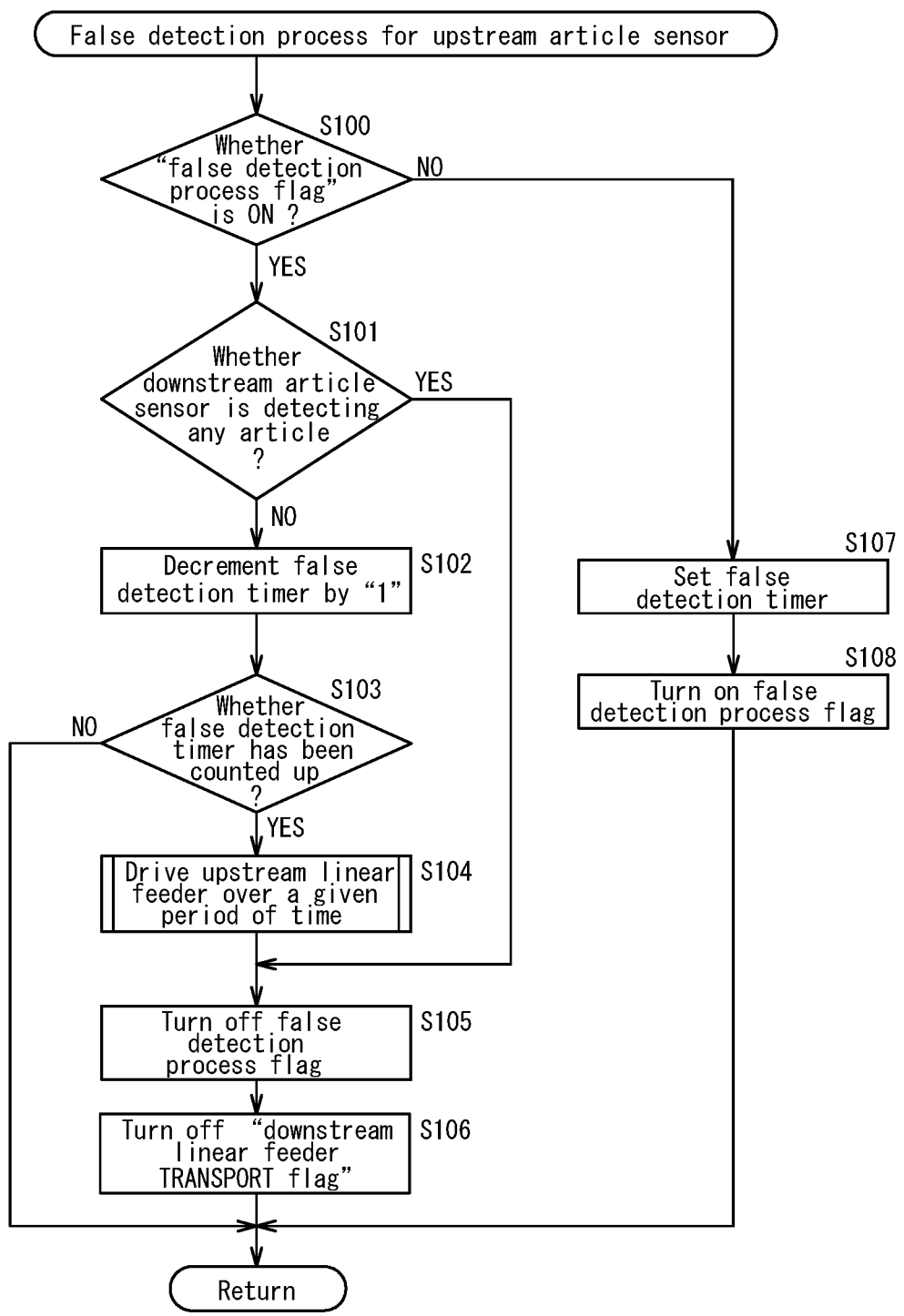
FIG. 11 is a flow chart of an exemplified false detection process for an upstream article sensor.

FIG. 11 is a flow chart of an exemplified false detection process for the upstream article sensor 21a illustrated in FIG. 10 (Step S27).

First, it is determined whether a "false detection process flag" is ON (Step S100). When this step determines that this flag is not ON, a false detection timer is set (Step S107). Then, the "false detection process flag" is turned on, and the process returns to the earlier step (Step S108).

When Step S100 determines that the false detection process flag is ON, it is determined whether any article has been detected by the downstream article sensor 21b (Step S101). When Step S101 determines that no article is detectable, the count value of the false detection timer is decremented by "1" (Step S102), and it is determined whether the false detection timer has been counted up (Step S103). The process returns to the earlier step when Step S103 determines that the timer has not been counted up, while the process proceeds to Step S104 when Step S103 determines that the timer has been counted up.

In Step S104, false detection of the upstream article sensor 21a is determined, and the upstream linear feeder 17a is driven to operate for a certain period of time, so that the article(s) that remains being stuck in a balanced state out of the discharge end of the trough 19a of the upstream linear feeder 17a is transported to the upstream end of the trough 19b of the downstream linear feeder 17b. Then, the process proceeds to Step S105. In Step S105, the "false detection process flag" is turned off. Then, the "downstream linear feeder TRANSPORT flag" is turned off, and the process returns to the earlier step (Step S106).

When, in Step S101, any article is being detected by the downstream article sensor 21b, the process proceeds to Step S105 (Step S31).

Figure 12:
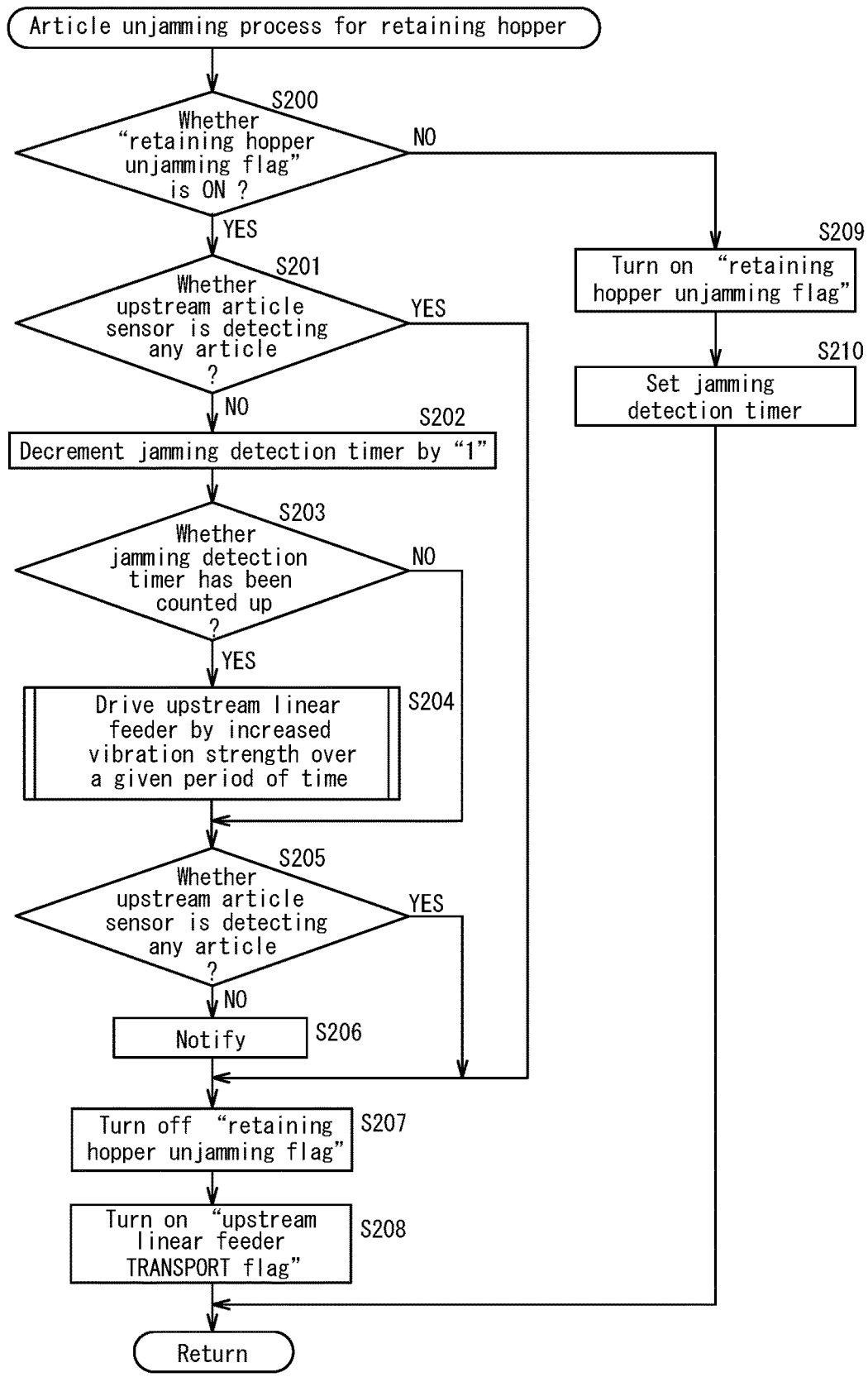
FIG. 12 is a flow chart of an exemplified article unjamming process for a retaining hopper.

FIG. 12 is a flow chart of an exemplified article unjamming process for the retaining hopper 16 illustrated in FIG. 10.

First, it is determined whether a "retaining hopper unjamming flag" is ON (Step S200). When this step determines that the "retaining hopper unjamming flag" is not ON, the "retaining hopper unjamming flag" is turned on (Step S209), and a jamming detection timer is set (Step S210). Then, the process returns to the earlier step.

When Step S200 determines that the "retaining hopper unjamming flag" is ON, it is determined whether any article has been detected by the upstream article sensor 21a (Step S201). When Step S201 determines that no article is being detected, the count value of the jamming detection timer is decremented by "1" (Step S202). Then, it is determined whether the jamming detection timer has been counted up (Step S203). When Step S203 determines that this timer has been counted up, it is determined that the articles are being jammed or stuck together in the retaining hopper 16, and the vibration strength of the upstream linear feeder 17a is increased. Then, the upstream linear feeder 17a is driven by this increased vibration strength, and the process proceeds to Step S205.

It is determined in Step S205 whether any article has been detected by the upstream article sensor 21a. When Step S205 determines that no article is being detected, the articles are still being jammed or stuck together even after the upstream linear feeder 17a is driven by the increased vibration strength. Such an abnormal status in supply of the articles is displayed to notify an operation of the current status (Step S206), and the process proceeds to Step S207. When Step S205 determines that any article is being detected, the process proceeds to Step S207.

In Step S207, the "retaining hopper unjamming flag" is turned off. Then, the "upstream linear feeder TRANSPORT flag" is turned off, and the process returns to the earlier step (Step S208).

When Step S205 determines that any article has been detected by the upstream article sensor 21a, the process proceeds to Step S207.

According to this embodiment, when the articles are found to be jammed or stuck together on the upstream side of the upstream linear feeder 17a, for example, at and/or in the vicinity of the supply port through which the articles are supplied into the upstream linear feeder 17a, the upstream linear feeder 17a is driven to operate by an increased vibration strength. An intensive vibration generated by the upstream linear feeder 17a thus driven by the increased vibration strength may successfully remove the article(s) blocking the supply port or loosen the articles being stuck together. Thus, an operator may no longer have to remove or loosen with hand any articles being jammed or stuck together.

In case the article(s) of which a part thereof remains being stuck out in a balanced stationary state upward above the upstream end of the downstream linear feeder 17b from the article-outgoing end of the upstream linear feeder 17a is wrongly detected by the upstream article detector 21a as such that has been supplied from the upstream linear feeder 17a into the downstream linear feeder 17b, the upstream linear feeder 17a starts to be driven. Thus, any article(s) sticking out of the article-outgoing end of the upstream linear feeder may be supplied into the downstream linear feeder, and normal and reliable transport of the articles may be successfully restarted. Therefore, an operator may no longer be required to supply the article(s), if any, that remains being stuck in a balanced state out of the article-outgoing end of the upstream linear feeder into the downstream linear feeder.

Thus, unmanned automatic operation of the weighing device may be continued for long hours.

Other Embodiments

1) The weighing device according to the embodiment described thus far may be useful in mixing and weighing articles that range in a wide variety. Optionally, this weighing device with a reduced number of sets of hoppers may be applicable for use in mixing and weighing a single type of articles.

Figure 13:
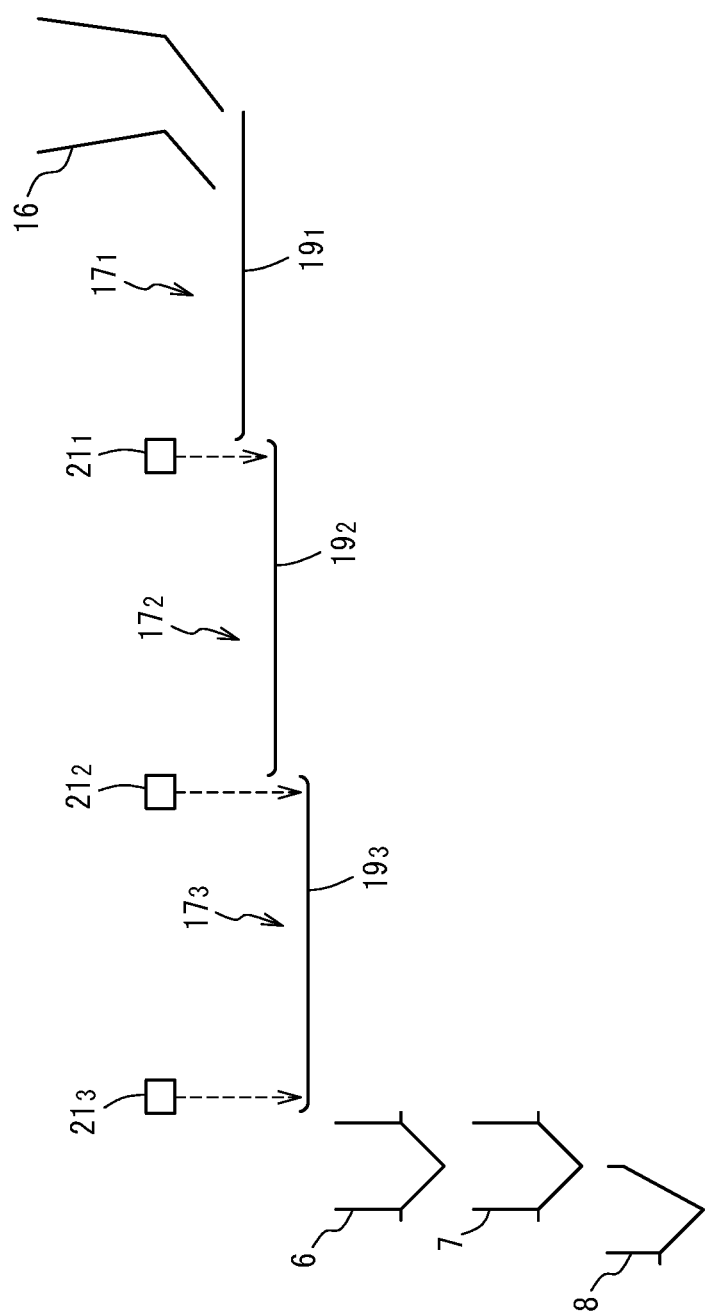
FIG. 13 is a schematic side view of a combination weighing device according to another embodiment of the present invention illustrated in part in the vicinity of linear feeders and weighing units.

2) According to the embodiment described thus far, the weighing device is equipped with two linear feeders, however, may be equipped with three or more linear feeders. As illustrated in FIG. 13, the weighing device may have three linear feeders; first to third linear feeders $17_1$ to $17_3$ that are disposed from the upstream side toward the downstream side, and three article sensors; first to third articles sensors $21_1$, $21_2$, and $21_3$. The first article sensor $21_1$ detects the articles at the upstream end of a trough $19_2$ of the second linear feeder $17_3$, and the second and third article sensors $21_2$ and $21_3$ detect the articles at the upstream and downstream ends of a trough $19_3$ of the third linear feeder $17_3$.

In this instance, the first linear feeder $17_1$ may be the upstream linear feeder, the second linear feeder $17_2$ may be the downstream linear feeder, and the first article sensor $21_1$ may be the upstream article sensor. Thus, the problems of any article(s) being jammed or stuck together in the retaining hopper 16 may be cleared in the same manner as described in the earlier embodiment.

In another instance, the first linear feeder $17_1$ may be the upstream linear feeder, the second linear feeder $17_2$ may be the downstream linear feeder, the first article sensor $21_1$ may be the upstream article sensor, and the second article sensor $21_2$ may be the downstream article sensor. With these linear feeders and article sensors being thus arranged, any article(s) that remains being stuck in a balanced stationary state out of the discharge end of a trough $19_1$ of the first linear feeder $17_1$ may be supplied into the trough $19_2$ of the second linear feeder $17_2$ in the same manner as described in the earlier embodiment. Otherwise, the second linear feeder $17_2$ may be the upstream linear feeder, the third linear feeder $17_3$ may be the downstream linear feeder, the second article sensor $21_2$ may be the upstream article sensor, and the third article sensor $21_3$ may be the downstream article sensor. With these linear feeders and article sensors being thus arranged, any article(s) that remains being stuck in a balanced stationary state out of the discharge end of the trough $19_2$ of the second linear feeder $17_2$ may be supplied into the trough $19_3$ of the third linear feeder $17_3$ in the same manner as described in the earlier embodiment.

Optionally, the first linear feeder $17_1$ may be the upstream linear feeder, and the third linear feeder $17_3$ may be the downstream linear feeder.

3) In the embodiment described earlier, the memory hoppers are added to the weighing units to increase the number of available hoppers that can participate in combinatorial computations. In this weighing device, however, the memory hoppers may be dispensable components.

REFERENCE SIGNS LIST 1A, 1B weighing device
4 weighing unit
5 article supplier
6 supply hopper
7 weighing hopper
8 memory hopper
15 retaining tank
17 supply feeder
17a upstream linear feeder
17b downstream linear feeder
19a, 19b trough
21a upstream article sensor
21b downstream article sensor
22 weight sensor
25 controller
26 operating setting display
27 computation controller

The invention claimed is:

1. A combination weighing device, comprising:
at least two linear feeders including an upstream linear feeder and a downstream linear feeder, the linear feeders being disposed to transport an article from an upstream side to a downstream side in a direction of transport;
a controller in charge of drive controls of the linear feeders; and
an upstream article detector that detects the article currently present at an upstream end of a trough of the downstream linear feeder in the direction of transport,
the controller being configured to, when the upstream article detector is not detecting the article, drive the upstream linear feeder to operate until the article is detected by the upstream article detector,
the controller being configured to, when a predetermined period of time is passed after the upstream linear feeder starts to be driven, drive the upstream linear feeder to operate by an increased vibration strength.

2. A combination weighing device, comprising:
at least two linear feeders including an upstream linear feeder and a downstream linear feeder, the linear feeders being disposed to transport an article from an upstream side to a downstream side in a direction of transport;
a controller in charge of drive controls of the linear feeders;
an upstream article detector that detects the article currently present at an upstream end of a trough of the downstream linear feeder in the direction of transport; and
a downstream article detector that detects the article currently present on the downstream side relative to the upstream article detector in the direction of transport,
the controller being configured to, when the upstream article detector is not detecting the article, drive the upstream linear feeder to operate until the article is detected,
the controller being configured to drive the downstream linear feeder to operate in a manner that the article is transported toward the downstream side,
the controller being configured to start to drive the upstream linear feeder when the article is not detected by the downstream article detector over a predetermined period of time after the controller drives the upstream linear feeder to operate until the article is detected by the upstream article detector and then suspends the operation of the upstream linear feeder.

3. A combination weighing device, comprising:
at least two linear feeders including an upstream linear feeder and a downstream linear feeder, the linear feeders being disposed to transport an article from an upstream side to a downstream side in a direction of transport;

a controller in charge of drive controls of the linear feeders;

an upstream article detector that detects the article currently present at an upstream end of a trough of the downstream linear feeder in the direction of transport; and a downstream article detector that detects the article currently present on the downstream side relative to the upstream article detector in the direction of transport, the controller being configured to, when the upstream article detector is not detecting the article, drive the upstream linear feeder to operate until the article is detected by the upstream article detector, the controller being configured to, when a first predetermined period of time is passed after the upstream linear feeder starts to be driven, drive the upstream linear feeder to operate by an increased vibration strength, the controller being configured to drive the downstream linear feeder to operate in a manner that the article is transported toward the downstream side, the controller being configured to start to drive the upstream linear feeder to operate when the article is not detected by the downstream article detector over a second predetermined period of time after the controller drives the upstream linear feeder to operate until the article is detected by the upstream article detector and then suspends the operation of the upstream linear feeder.

4. The combination weighing device according to claim 1 or 3, further comprising:

a retaining hopper in which the article is retainable, the retaining hopper being allowed to supply the article currently retained to the upstream end of the trough of the upstream linear feeder; and a notifier controllable by the controller, the notifier being configured to notify an abnormal status in supply of the article from the retaining hopper into the trough of the upstream linear feeder, wherein the controller prompts the notifier to notify that the abnormal status is occurring in supply of the article when the article is not detected by the upstream article detector over a predetermined period of time after the upstream linear feeder starts to be driven by the increased vibration strength.

5. The combination weighing device according to claim 2 or 3, further comprising an article sensor that detects the article at the downstream end of the trough of the downstream linear feeder, wherein the controller, when the article sensor is not detecting the article, drives the downstream linear feeder to operate until the article is detected by the article sensor.

6. The combination weighing device according to claim 5, wherein the downstream article detector that detects the article on the downstream side relative to the upstream article detector in the direction of transport is at least one of the article sensor and a weight sensor that measures a weight of the article in a weighing hopper disposed on the downstream side relative to the downstream linear feeder.

7. The combination weighing device according to one of claims 1 to 3, comprising:

a plurality of sets of linear feeders each including at least two linear feeders that are the upstream linear feeder and the downstream linear feeder, the plurality of sets of linear feeders being linearly arranged next to each other; and a plurality of weighing units each including a supply hopper and a weighing hopper that are vertically disposed, the plurality of weighing units being linearly arranged next to each other, wherein the supply hoppers are adapted to retain and discharge the articles supplied from the downstream linear feeders of the plurality of sets of linear feeders, and the weighing hoppers are adapted to retain and weigh the articles discharged from the supply units.

8. The combination weighing device according to claim 4, comprising:

a plurality of sets of linear feeders each including at least two linear feeders that are the upstream linear feeder and the downstream linear feeder, the plurality of sets of linear feeders being linearly arranged next to each other; and a plurality of weighing units each including a supply hopper and a weighing hopper that are vertically disposed, the plurality of weighing units being linearly arranged next to each other, wherein the supply hoppers are adapted to retain and discharge the articles supplied from the downstream linear feeders of the plurality of sets of linear feeders, and the weighing hoppers are adapted to retain and weigh the articles discharged from the supply units.

9. The combination weighing device according to claim 5, comprising:

a plurality of sets of linear feeders each including at least two linear feeders that are the upstream linear feeder and the downstream linear feeder, the plurality of sets of linear feeders being linearly arranged next to each other; and a plurality of weighing units each including a supply hopper and a weighing hopper that are vertically disposed, the plurality of weighing units being linearly arranged next to each other, wherein the supply hoppers are adapted to retain and discharge the articles supplied from the downstream linear feeders of the plurality of sets of linear feeders, and the weighing hoppers are adapted to retain and weigh the articles discharged from the supply units.

10. The combination weighing device according to claim 6, comprising:

a plurality of sets of linear feeders each including at least two linear feeders that are the upstream linear feeder and the downstream linear feeder, the plurality of sets of linear feeders being linearly arranged next to each other; and a plurality of weighing units each including a supply hopper and a weighing hopper that are vertically disposed, the plurality of weighing units being linearly arranged next to each other, wherein the supply hoppers are adapted to retain and discharge the articles supplied from the downstream linear feeders of the plurality of sets of linear feeders, and the weighing hoppers are adapted to retain and weigh the articles discharged from the supply units.

* * * * *